June 14, 1955 J. H. McGINNIS 2,710,484
FISH HOOK AND FLY HOLDER
Filed March 30, 1954
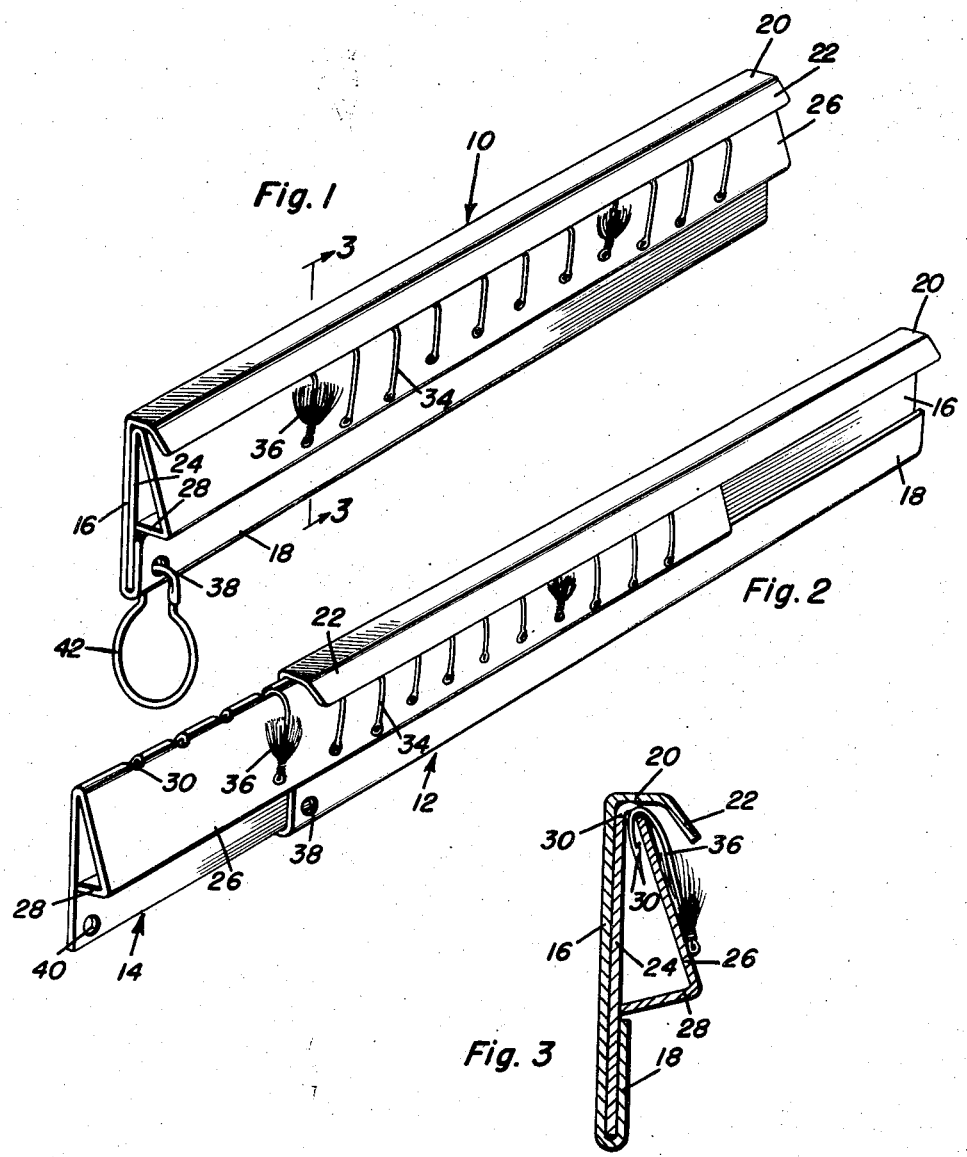
Jack H. McGinnis
INVENTOR.

United States Patent Office 2,710,484
Patented June 14, 1955

2,710,484

FISH HOOK AND FLY HOLDER

Jack H. McGinnis, San Bernardino, Calif.

Application March 30, 1954, Serial No. 419,724

4 Claims. (Cl. 43—57.5)

This invention relates to a fish hook and fly holder especially useful for fishermen in retaining the pointed ends of hooks in protected position.

An object of this invention is to provide a fish hook and a fly holder having a pair of telescopic members and a fastener for retaining the telescopic members in assembled relation wherein the barbs of the hooks are positioned between the telescopic members in a protected position thereby preventing the fouling of the pointed ends of the hooks with each other and with other fishing apparatus.

Still another important object of this invention is to provide a fish hook and fly holder which is simple in construction, easy to utilize, well adapted for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the fish hook and fly holder of the present invention in its assembled position;

Figure 2 is a perspective view showing the present invention in a partially extended position wherein access is given to a fish hook; and Figure 3 is a transverse vertical section taken substantially along section line 3—3 of Figure 1.

Referring now specifically to the drawings, it will be seen that the numeral 10 generally designates the fish hook and fly holder of the present invention including a generally U-shaped trackway member 12 and a holder member 14 slidable therein. The trackway 12 includes an elongated back plate 16 having its lower edge forwardly and reversely bent in spaced parallel relation as indicated by the numeral 18. The upper edge of the plate 16 includes a forwardly projecting flange 20 terminating in a downwardly and forwardly directed flange 22 wherein the flanges 20 and 22 and the return bent portion 18 form a trackway for slidably receiving the holder 14. The holder 14 includes an elongated flat plate portion 24 slidably receivable between the return bent portion 18 and the back plate 16, and the other portion of the holder terminating in a downwardly and forwardly extending flange 26 having an inturned flange 28 at its lower end which terminates in abutting relation to the forward surface of the plate 24. The upper bent edge of the holder 14 is provided with a plurality of longitudinally spaced apertures 30 of varying size for receiving the pointed or barbed ends 32 of fish hooks 34 or flies 36. It will be seen that the surface formed by the downwardly and forwardly extending flange 26 forms a support for the shanks of the hooks 34 and the flies 36 in cooperation with the apertures 30 which extend across the juncture of the flat plate 24 and the flange 26. The apertures 30 are so located as to permit the hooks 34 to be positioned in the holder and simultaneously permits the holder 14 to be slidable under the flange 20 and flange 22 on the plate 16 of the trackway 12. When the hooks 34 are placed in the apertures 30 and the holder 14 is slid into the trackway 12, the hooks 34 are retained in longitudinally spaced relation, thereby providing a holder for the hooks wherein said hooks are positioned for easy access. The trackway 12 is provided with an aperture 38 adjacent one corner thereof and the holder 14 is provided with an aperture 40 which is alignable with the aperture 38 when the holder 14 is telescoped completely into the trackway 12. A ring fastener 42 may be inserted through the apertures 40 and 38 thereby securing the holder 14 in the trackway 12. This assures that the hooks 34 and the flies 36 will be retained in position while the device is carried in a fisherman's pocket or tackle box. It will be seen that the fish hook and fly holder 10 of the present invention secures the fish hooks 34 and the flies 36 in an easily accessible position for securing leaders thereto and for selecting a suitably sized hook for the purpose desired. The device may be constructed of a suitable material such as stainless steel or plastic which is substantially rust and corrosive-proof and of a strength necessary to withstand the usual stresses and strains of this type of device.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fish hook and fly holder comprising an elongated body member having forwardly projecting upper and lower flanges forming a generally U-shaped trackway, an elongated holder telescopically receivable in said trackway, said holder being provided with a plurality of longitudinally spaced apertures adapted to receive the pointed ends of fish hooks, the apertures in the holder underlying the upper forwardly projecting flange on said body when the holder is inserted into said body thereby retaining the ends of the fish hooks in the apertures.

2. A fish hook and fly holder comprising an elongated body member having forwardly projecting upper and lower flanges forming a generally U-shaped trackway, an elongated holder telescopically receivable in said trackway, said holder being provided with a plurality of longitudinally spaced apertures adapted to receive the pointed ends of fish hooks, the apertures in the holder underlying the upper forwardly projecting flange on said body when the holder is inserted into said body thereby retaining the ends of the fish hooks in the apertures, said body and holder being provided with alignable apertures adapted to receive a fastening member adapted to secure the holder within the body.

3. A fish hook and fly holder comprising an elongated body member having forwardly projecting upper and lower flanges forming a generally U-shaped trackway, an elongated holder telescopically receivable in said trackway, said holder being provided with a plurality of longitudinally spaced apertures adapted to receive the pointed ends of fish hooks, the apertures in the holder underlying the upper forwardly projecting flange on said body when the holder is inserted into said body thereby retaining the ends of the fish hooks in the apertures, the upper of said forwardly projecting flanges on said body terminating in a downwardly and forwardly directed flange positioned in spaced relation to the main portion of said body.

4. A fish hook and fly holder comprising an elongated body member having forwardly projecting upper and lower flanges forming a generally U-shaped trackway, an elongated holder telescopically receivable in said trackway, said holder being provided with a plurality of longitudinally spaced apertures adapted to receive the pointed ends of fish hooks, the apertures in the holder underlying the upper forwardly projecting flange on said body when the holder is inserted into said body thereby retaining the ends of the fish hooks in the apertures, the upper of said forwardly projecting flanges terminating in a downwardly and forwardly extending flange, said holder having a downwardly and forwardly extending portion diverging from the plane of the central portion of the holder and terminating in a rearwardly extending flange adapted to engage the central portion of the holder, the fish hook pointed end receiving apertures being positioned in said upper edge of the holder, said diverging flange on the holder being adapted to support the shanks of the fish hooks when the pointed ends thereof are positioned in the apertures.

References Cited in the file of this patent

UNITED STATES PATENTS

| | | |
|---|---|---|
| 485,582 | Howe | Nov. 1, 1892 |
| 765,730 | Hoag | July 26, 1904 |
| 1,076,894 | Langbein | Oct. 28, 1913 |
| 1,422,233 | Stern | July 11, 1922 |
| 1,977,243 | Vanderhider et al. | Apr. 9, 1935 |
| 2,447,105 | Vogel | Aug. 17, 1948 |
| 2,578,424 | Hart | Dec. 11, 1951 |